Aug. 5, 1958  R. M. CARRIER, JR  2,846,210
RESILIENT CONNECTORS

Filed April 6, 1955  11 Sheets-Sheet 1

INVENTOR.
ROBERT M. CARRIER JR.
BY
Oberlin & Limbach
ATTORNEYS

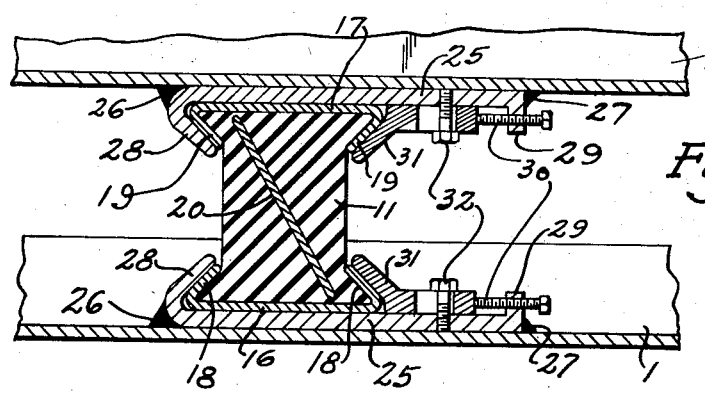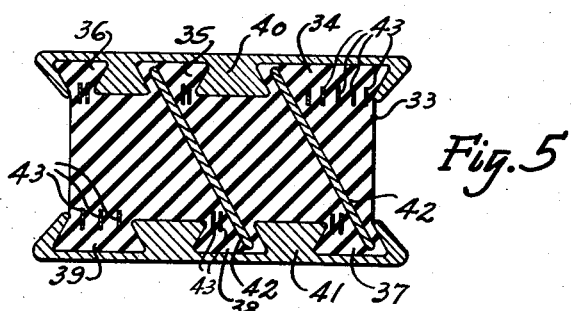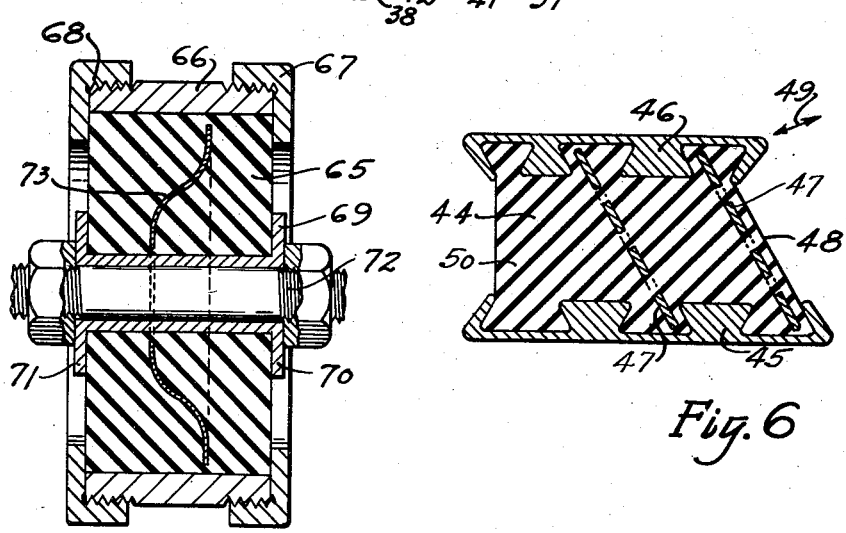

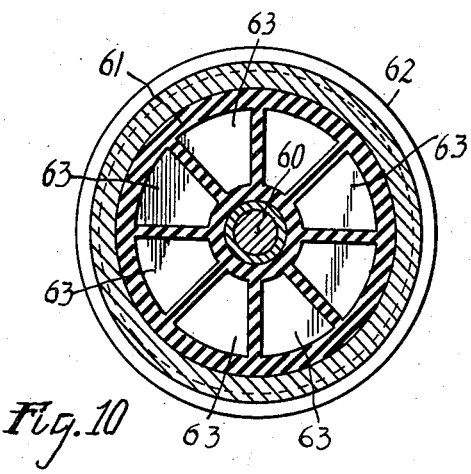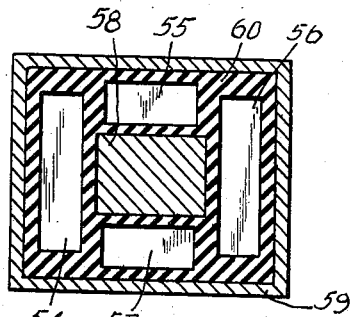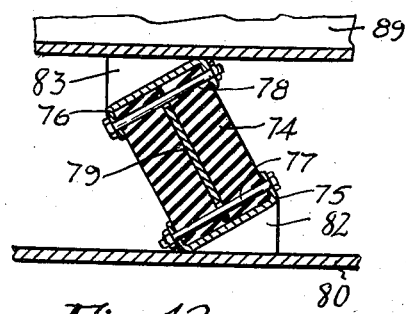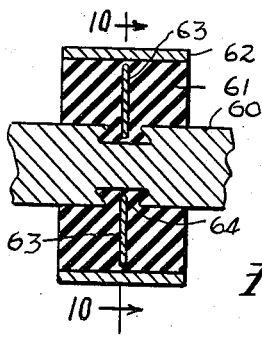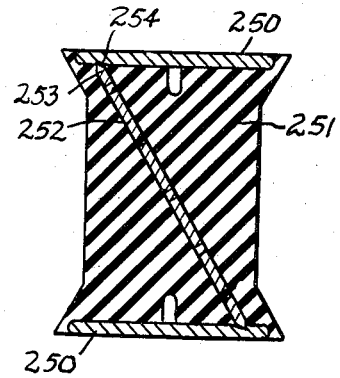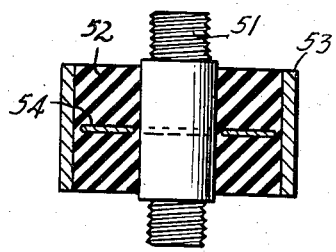

Aug. 5, 1958  R. M. CARRIER, JR  2,846,210
RESILIENT CONNECTORS
Filed April 6, 1955  11 Sheets-Sheet 4
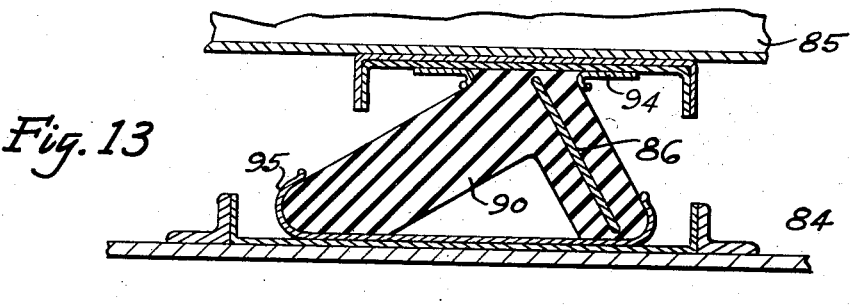
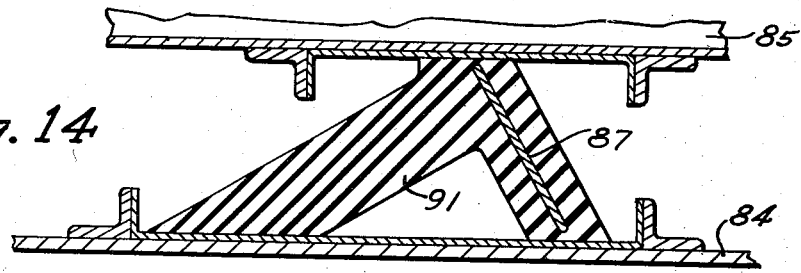
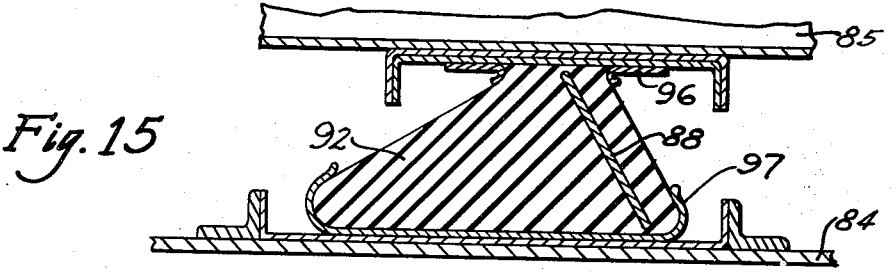
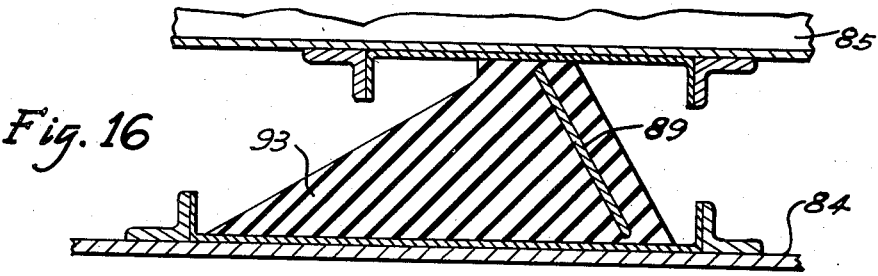
INVENTOR.
ROBERT M. CARRIER JR.
BY
Oberlin & Limbach
ATTORNEYS Aug. 5, 1958  R. M. CARRIER, JR  2,846,210
RESILIENT CONNECTORS Filed April 6, 1955  11 Sheets-Sheet 5

INVENTOR.
ROBERT M. CARRIER JR.
BY
Oberlin & Limbach
ATTORNEYS

Aug. 5, 1958
R. M. CARRIER, JR
2,846,210
RESILIENT CONNECTORS
Filed April 6, 1955
11 Sheets-Sheet 6
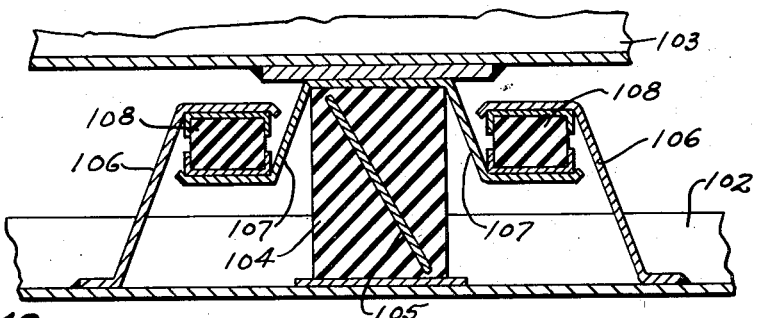
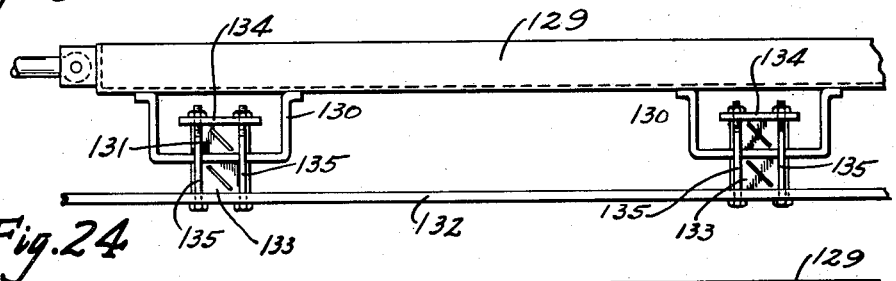
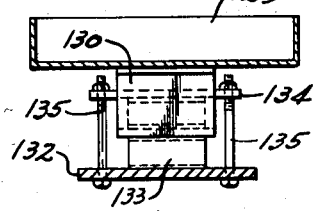
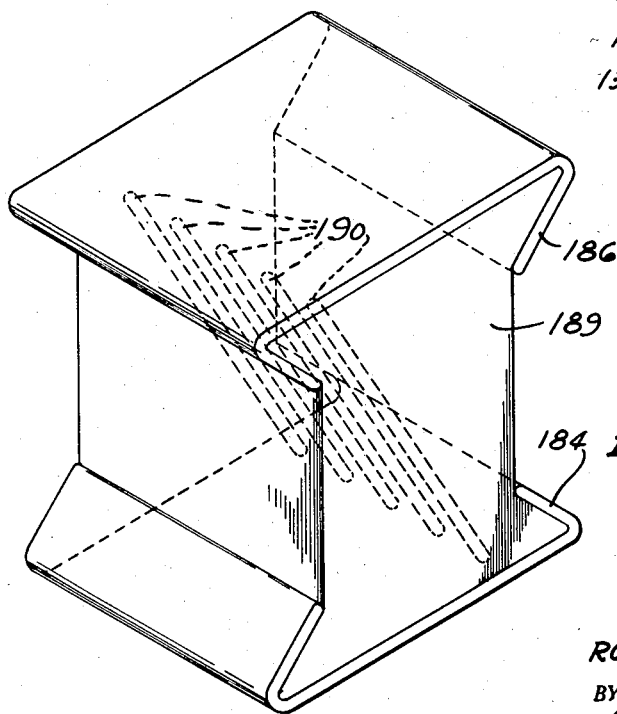
INVENTOR.
ROBERT M. CARRIER JR.
BY
*Oberlin & Limbach*
ATTORNEYS Aug. 5, 1958 R. M. CARRIER, JR 2,846,210
RESILIENT CONNECTORS Filed April 6, 1955 11 Sheets-Sheet 7

INVENTOR.
ROBERT M. CARRIER JR.
BY
Oberlin & Limbach
ATTORNEYS.

Aug. 5, 1958

R. M. CARRIER, JR 2,846,210

RESILIENT CONNECTORS

Filed April 6, 1955

INVENTOR.
ROBERT M. CARRIER JR.
BY Oberlin & Limbach
ATTORNEYS.

Aug. 5, 1958  R. M. CARRIER, JR  2,846,210
RESILIENT CONNECTORS
Filed April 6, 1955  11 Sheets-Sheet 9

INVENTOR.
ROBERT M. CARRIER JR.
BY
Oberlin & Limbach
ATTORNEYS

Aug. 5, 1958

R. M. CARRIER, JR 2,846,210

RESILIENT CONNECTORS

Filed April 6, 1955

INVENTOR.
ROBERT M. CARRIER JR.
BY
Oberlin & Limbach
ATTORNEYS

Aug. 5, 1958  R. M. CARRIER, JR  2,846,210
RESILIENT CONNECTORS
Filed April 6, 1955  11 Sheets-Sheet 11

INVENTOR.
ROBERT M. CARRIER JR.
BY
Oberlin & Limbach
ATTORNEYS

United States Patent Office 2,846,210
Patented Aug. 5, 1958

2,846,210

RESILIENT CONNECTORS

Robert M. Carrier, Jr., Louisville, Ky., assignor to Carrier Conveyor Corporation, Louisville, Ky., a corporation of Kentucky Application April 6, 1955, Serial No. 499,630

6 Claims. (Cl. 267—1)

This invention relates as indicated to resilient connectors, and more especially to connectors of the type which provide for resiliently opposed and guided relative movement between machine parts and the like.

This invention is concerned primarily with connectors of the type in which relative movement between the parts with which the connector is associated is resiliently opposed by means of an elastomer such as rubber either natural or synthetic. The use of elastomers for the purpose of providing resiliently opposed connection between machine elements is quite old. However, prior art devices of this character have been objectionable and not capable of use in many environments because the elastomeric body, in order to provide for sufficient relative movement along the principal plane in which such relative movement is to occur, have provided also for substantially universal movement between the machine parts in more than one direction.

It is a principal object of this invention to provide a resilient connector utilizing an elastomeric body but so formed and constructed that while the full elastic properties of the elastomer can be utilized along the line along which most of the relative movement is to occur, nevertheless movement in at least some of the other directions is substantially restrained.

It is a further object of the invention to provide a connector which has all of these desired properties and which is adapted to a wide variety of uses and can be manufactured at a reasonable cost.

It is a further object of the invention to provide a connector in which the movement between the relatively movable machine parts is accurately controlled in one direction while permitting only such opposition to such relative movement in another direction as is provided by the resiliency of the elastomeric material from which the connector body is formed.

It is a further object of the invention to provide a connector of the character described in which the said controlled relative movement is adjustable.

Other objects of the invention will appear as the description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 4 is a transverse sectional view of portions of a vibratory conveyor for example illustrating one manner in which the connector of this invention may be assembled with the relatively movable parts of the machine;

Fig. 5 is a transverse sectional view of a connector constructed somewhat similarly to Fig. 3, but showing a modified form of construction;

Fig. 6 is still another transverse sectional view of a connector of a slightly modified form;

Fig. 7 is a sectional view of a connector such as is used as a motor mount for instance and illustrating the manner in which a connector in accordance with the present invention may be assembled;

Fig. 8 is a sectional view of a modified form of construction similar to that illustrated in Fig. 7 but taken on a plane which is at right angles to the plane of Fig. 7;

Fig. 9 is another sectional view of the character illustrated in Fig. 7 and Fig. 8 indicating an alternative form of construction;

Fig. 10 is a transverse sectional view of the construction illustrated in Fig. 9 taken on a plane substantially indicated by the line 10—10;

Fig. 11 is yet another modified form of mount generally similar in its mode of operation to the forms of construction illustrated in Figs. 7 to 10 inclusive, but showing a modified form of the means for supporting the elastomer and a modified form of the means relied upon to give guidance between the relative movable machine parts with which the mount is used;

Fig. 12 is a view generally similar to Fig. 4 showing an alternative manner in which the connector or mount assembly may be interposed between the relatively movable machine parts and showing also an alternative form of construction of the mount itself;

Fig. 12A is a transverse sectional view of an alternate form of construction;

Figure 1:
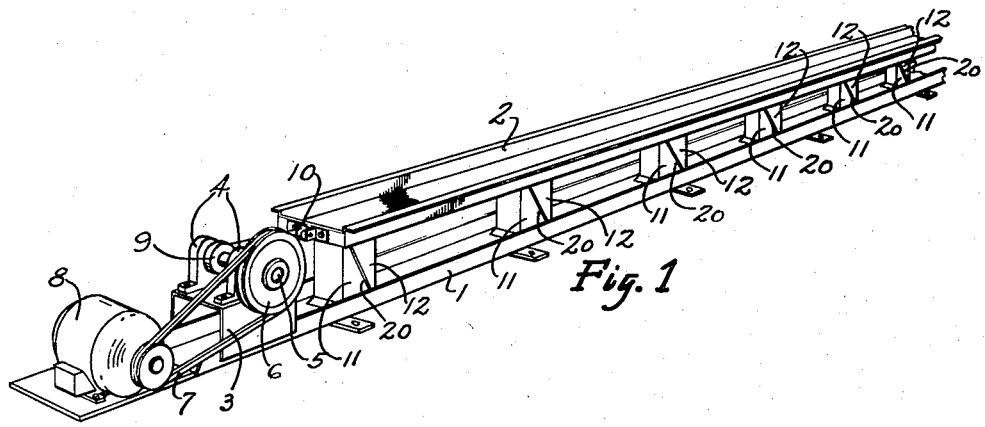
Fig. 1 is a perspective view of a vibratory conveyor utilizing a connector or resilient support constructed in accordance with the principles of this invention.
Figure 3:
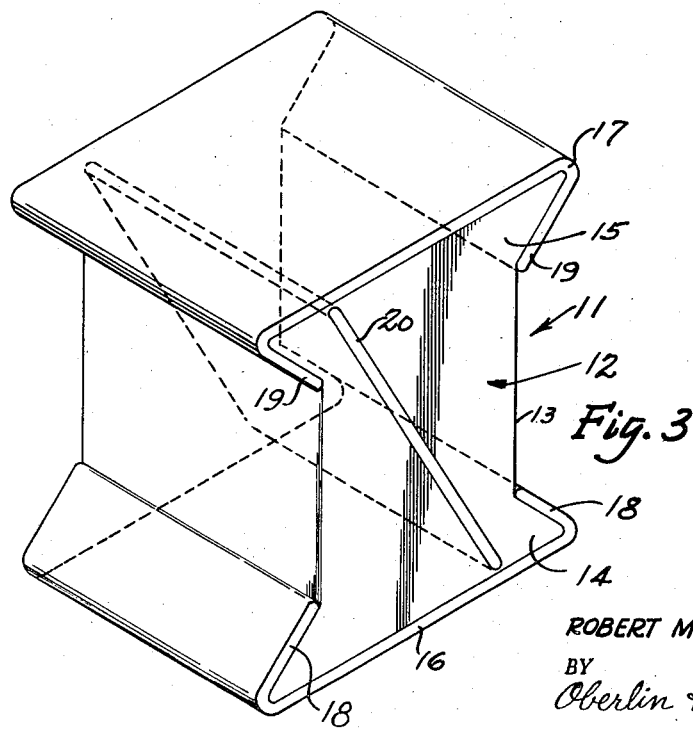
Fig. 3 is a perspective view of one form of the connector or mount which is the subject matter of this invention.
Figure 18:
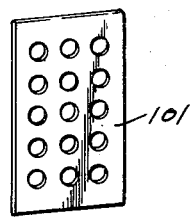
Figure 17:
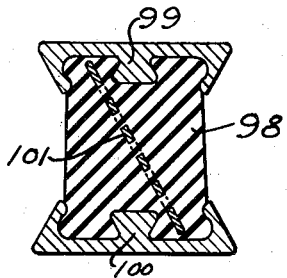
Figure 20:
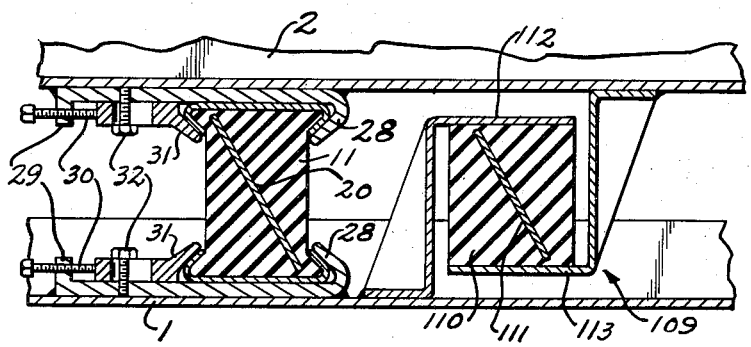
Figure 22:
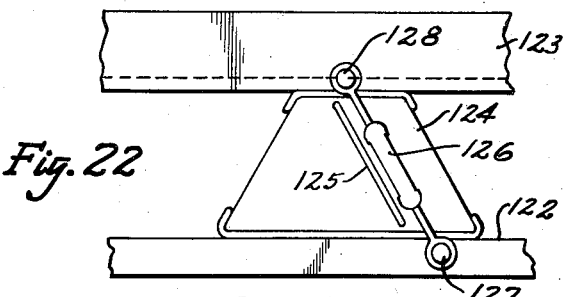
Figure 23:
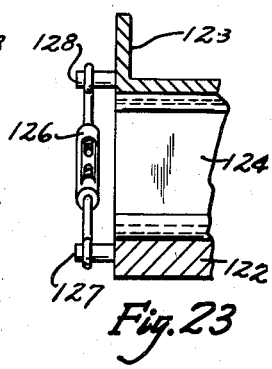
Figure 21:
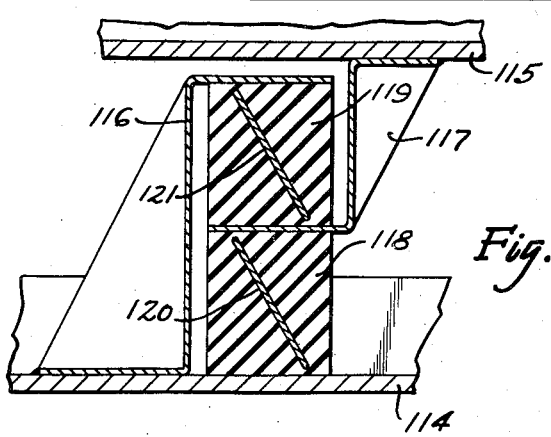
Figure 26:
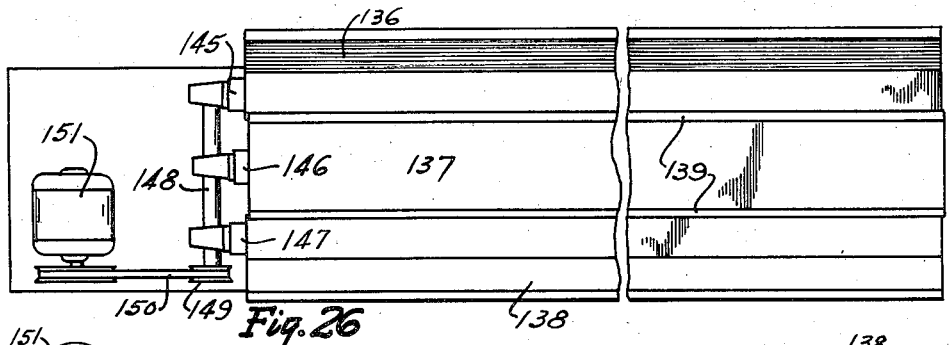
Figure 27:
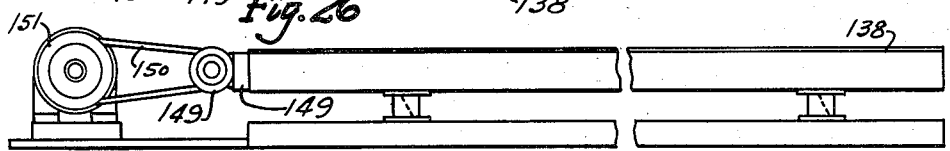
Figure 30:
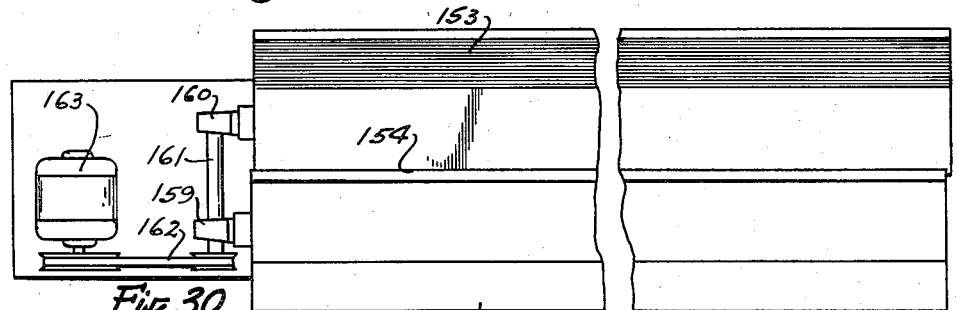
Figure 31:
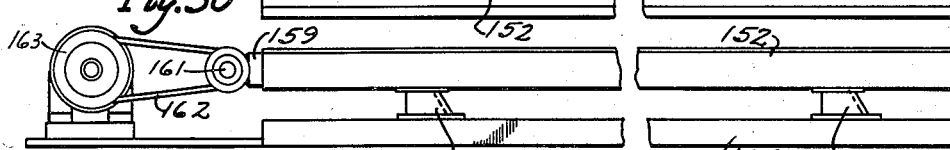
Figure 28:
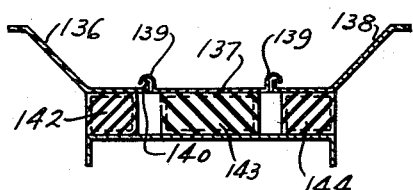
Figure 32:
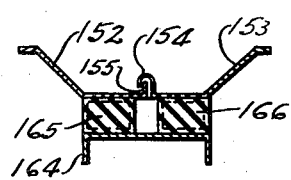
Figure 35:
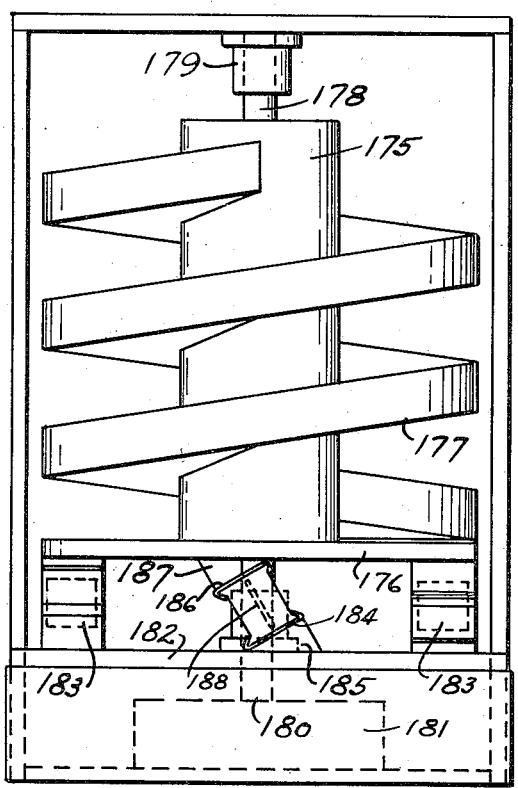
Figure 33:
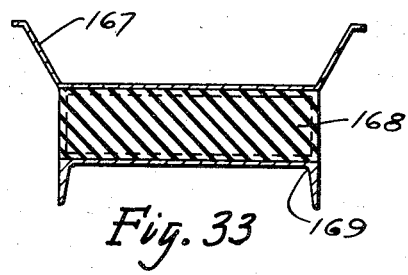
Figure 34:
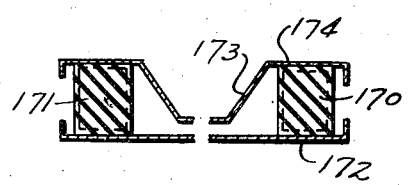
Figure 36:
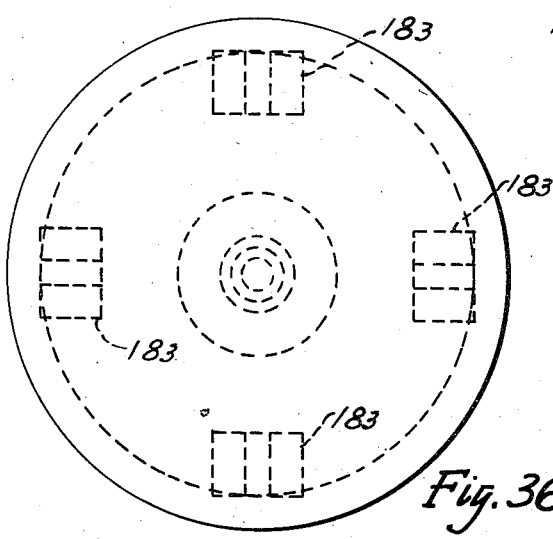
Figure 39:
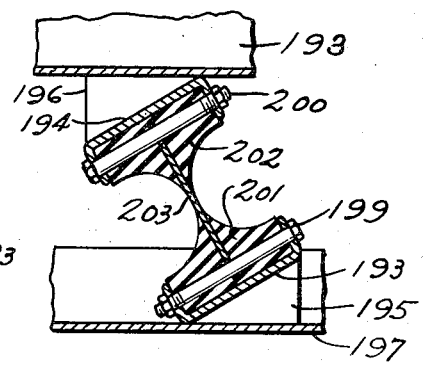
Figure 38:
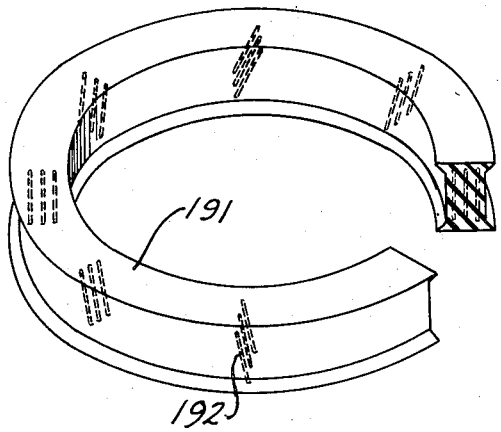
Figure 40:
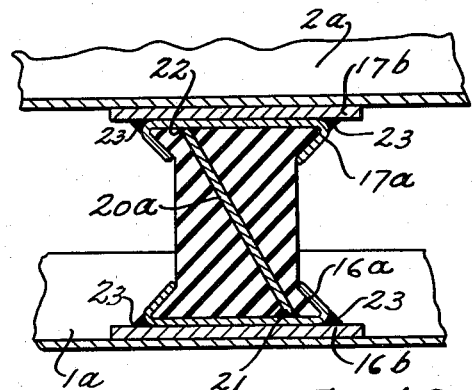
Figure 29:
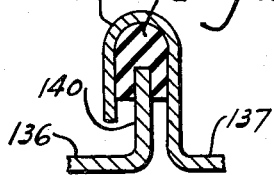
Figure 48:
Figure 42:
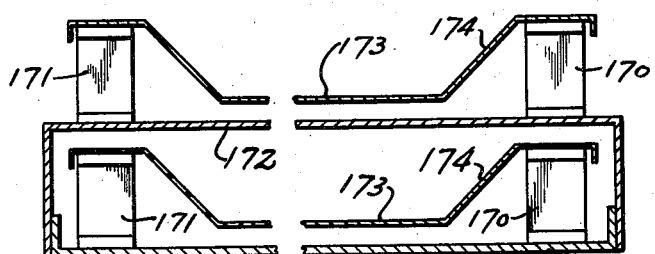
Figure 41:
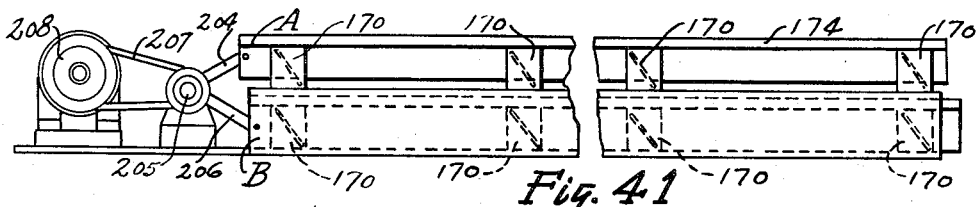
Figure 43:
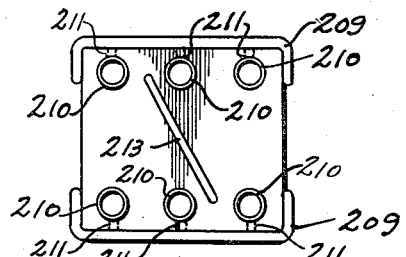
Figure 44:
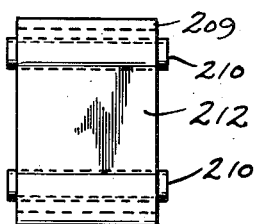
Figure 45:
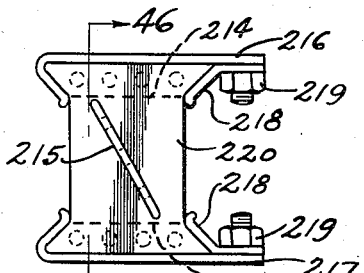
Figure 46:
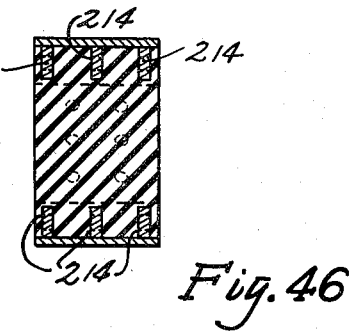
Figure 47:
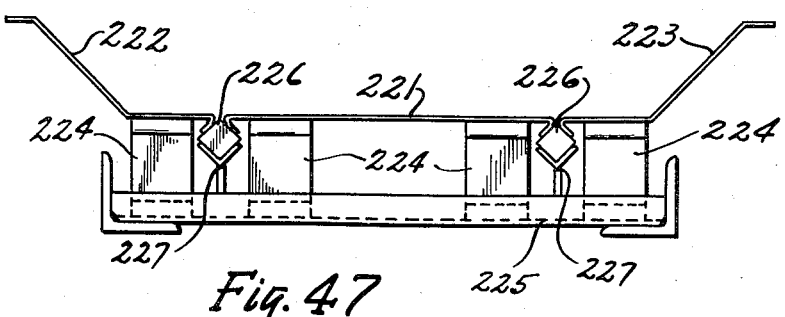
Figure 49:
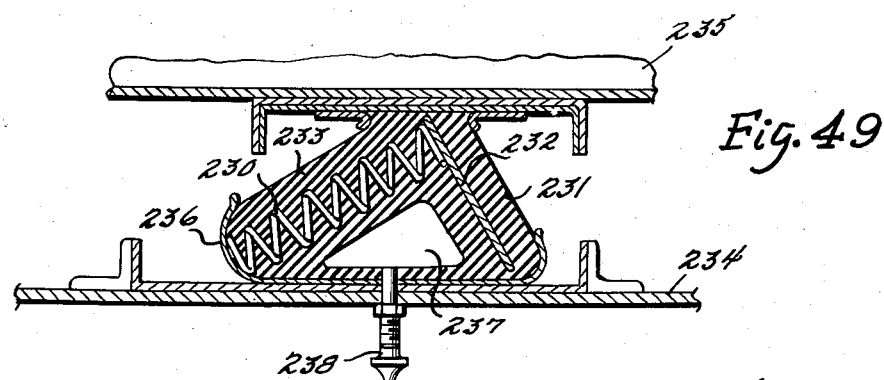
Figure 50:
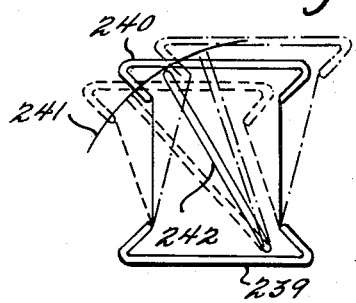
Figure 51:
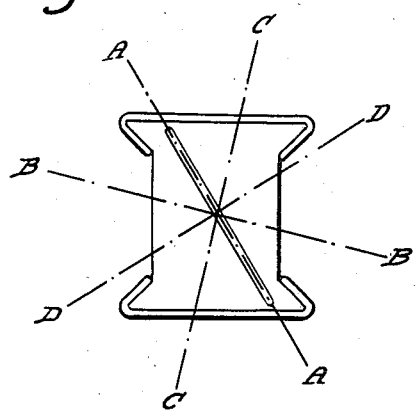
Figure 52:
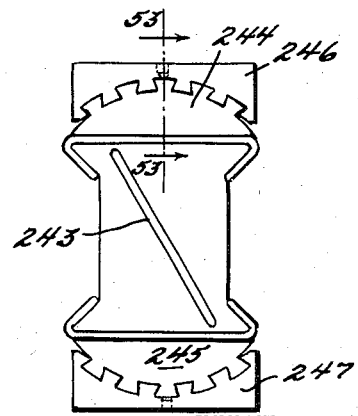
Figure 53:
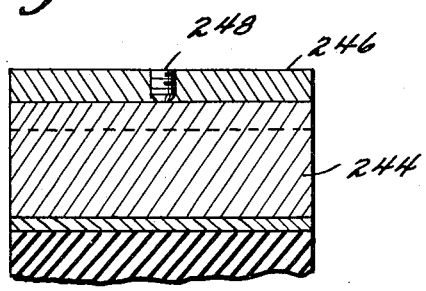

Figs. 13 to 16, inclusive, are transverse sectional views of alternative forms of mount construction and illustrating various ways in which the mount may be connected between the relatively movable machine parts;

Fig. 17 is a transverse sectional view of still another modified form of mount or connector;

Fig. 18 is a perspective view of the reenforcing plate which forms a part of the assembly of the mount shown in Fig. 17;

Figs. 19, 20 and 21 are illustrations of the manner in which the mounts or connectors of the present invention may be employed between relatively movable machine parts with provision for distribution of the loads in at least some directions between a plurality of mounts or a single mount and a plurality of plain elastomeric bodies;

Fig. 22 is a side elevational view indicating another way in which the mount or connector may be assembled between relatively movable parts of a machine;

Fig. 23 is an end elevation of the assembly illustrated in Fig. 22;

Fig. 24 is a side elevation of a portion of a vibratory conveyor illustrating one manner in which the mounts formed in accordance with the present invention may be installed under a vibratory conveyor;

Fig. 25 is an end elevational view of one of the mounts shown in Fig. 24;

Fig. 26 is a top plan view of a sectional vibratory conveyor in which the longitudinally extending pan is divided into three sections with the outer sections vibrated in synchronism and in phase and with the center section vibrated in synchronism with the outer sections, but 180° out of phase;

Fig. 27 is a side elevational view of the conveyor illustrated in Fig. 26;

Fig. 28 is a transverse sectional view of the pan portion of the conveyor illustrated in Figs. 26 and 27;

Fig. 29 is a fragmentary sectional view of that portion of the pan sections as shown in Fig. 28 at the point where they overlap;

Fig. 30 is a plan view of a vibratory conveyor in which the pan is divided into two longitudinally extending sections adapted for vibration in synchronism, but 180° out of phase;

Fig. 31 is a side elevational view of a conveyor illustrated in Fig. 30;

Fig. 32 is a transverse sectional view of a portion of the conveyor illustrated in Fig. 31;

Fig. 33 is a transverse sectional view of a vibratory conveyor showing a single pan and the manner in which the mount or connection of the present invention may be associated therewith;

Fig. 34 is a view similar to Fig. 33, but showing an alternative form of construction;

Fig. 35 is a side elevational view of a spiral conveyor illustrating the manner in which the mount or connections of the present invention may be utilized therewith;

Fig. 36 is a bottom view of the conveyor illustrated in Fig. 35;

Fig. 37 is a perspective view similar to Fig. 3, but illustrating the form of construction of connector designed primarily for use with a vibratory conveyor such as that illustrated in Figs. 35 and 36;

Fig. 38 is a perspective view partially in section of yet another form of connector or mount which may be utilized for example with a spiral conveyor such as that illustrated in Fig. 35;

Fig. 39 is a transverse sectional view of yet another modified form of connector or mount constructed in accordance with the principles of this invention;

Fig. 40 is a transverse sectional view of still another form of connector or mount constructed in accordance with this invention;

Fig. 41 is a side elevational view illustrating the manner in which a mount or coupling constructed in accordance with this invention may be utilized with a dual conveyor in which two conveyor pans are mounted, one above the other;

Fig. 42 is a transverse sectional view of the conveyor as illustrated in Fig. 41;

Fig. 43 is a side elevational view of another modified form of mount or connector constructed in accordance with this invention;

Fig. 44 is a side elevational view of the structure illustrated in Fig. 43;

Fig. 45 is a side elevational view of yet another form of mount embodying the principles of this invention;

Fig. 46 is a transverse sectional view of the mount illustrated in Fig. 45 taken on a plane substantially indicated by the line 46—46;

Fig. 47 is a transverse sectional view of a vibratory conveyor in which the trough is divided into three longitudinally extending sections adapted for vibration similar to the manner in which the vibrator of Fig. 26 is operated, but showing a modified form of the means for supporting such conveyor and sealing the spaces between the longitudinal sections;

Fig. 48 is a fragmentary sectional view illustrative of the manner in which the adjacent sections of multi-sectional conveyors such as those illustrated in Figs. 26, 30 and 47 may have the pan sections thereof joined, permitting relative movement therebetween;

Fig. 49 is a transverse sectional view of a further modification of the connector or mount of this invention showing included therein a means, such as a spring, for the purpose of more accurately controlling the natural frequency of the mount or connector;

Fig. 50 is a schematic diagram illustrating the manner in which the connector or mount constructed, as for example in Fig. 3, flexes or changes shape during use, as for instance when supporting the pan of vibratory conveyor as illustrated in Fig. 1;

Fig. 51 is a transverse sectional view of a connector or mount of the type illustrated in Fig. 3 illustrative of the various axes along which the resiliency of the connector or mount is substantially different;

Fig. 52 is a side elevational view illustrating an alternative form of construction of the means whereby the connector or mount may be utilized in different angular positions; and Fig. 53 is a transverse sectional view of the structure illustrated in Fig. 52 taken on a plane substantially indicated by the line 53—53.

The mounts or connectors to which the present invention is directed have a wide field of application and may be used almost in any environment where it is desired to provide for resilient oppositions to the relative movement between movable parts such as machine parts. The mounts of the present invention are particularly useful where it is desired that such relative movement, while only freely resiliently opposed in one direction, is nevertheless opposed or guided in one or more of the other possible directions of relative movement. One type of machinery in which it is desired to have resiliently opposed guided relative movements between two working parts is the vibratory conveyors of the type in which a pan is vibrated along and in a particular path of movement relative to the ground so that the material placed on the conveyor pan is caused to move therealong. As illustrative, therefore, of one environment in which the mounts or connectors of the present invention will be of particular utility, the following description will be concerned largely with equipment of this kind, although, as the description proceeds, it will become evident that the mounts or connectors of the present invention have a field of utility which is indeed very wide and the advantages which are particularly secured by the use of this new mount in a vibratory conveyor will readily suggest to those skilled in the art other environments not referred to specifically herein in which the mount or connector will prove to have utility.

Referring now more specifically to the drawings and more especially to Fig. 1, the conveyor here illustrated comprises generally a base 1 and a trough or pan 2. Adjacent one end of the base 1, there is a pedestal generally indicated at 3 on which is mounted a pair of bearing blocks 4 in which is journalled a shaft 5 driven by a pulley 6 through a belt 7 and a motor 8. Mounted centrally on the shaft 5 is an eccentric 9 to which is connected a pitman arm 10 which, at its other end, is pinned to the pan 2 of the conveyor. Interposed between the base 1 and the pan 2 are a plurality of mounts or connectors constructed in accordance with this invention. The form of such mount or connector utilized in the conveyor of Fig. 1 may be any of the modifications hereinafter more particularly described, although the one illustrated as having been used in Fig. 1 is shown drawn to an enlarged scale in the perspective view, Fig. 3.

The mount shown in Fig. 3 consists of a rubber block generally indicated at 12 which has a substantially rectangular main body portion 13 and enlarged end portions 14 and 15. Clamped about the end portions 14 and 15, are metal plates 16 and 17 respectively and which are rebent at their ends 18 and 19 for the purpose of firmly gripping the large ends 14 and 15 of the rubber block.

Molded in the rubber block 12 is a plate-like strut 20 which is preferably sufficiently strong so as to substantially withstand deformation of the rubber mount in which it is molded in the direction along the plane occupied by the strut. A metal plate which is perforated throughout its body so as to facilitate bonding of the rubber thereto and therethrough will be found to be a satisfactory form of the strut 20.

From an inspection of Fig. 1, it will be observed that because of the angular relation of the strut 20 to the horizontal, as the pitman arm 10 moves the pan 2 longitudinally with respect to the base 1, the strut will act as a lever causing the pan 2 to have a vertical component of movement in conjunction with its horizontal component. The extent of the vertical component of movement in relation to the extent of its horizontal component will, of course, be dependent to a certain extent at least on the angular relation of the strut 20 with respect to the horizontal.

In the form of construction illustrated in Fig. 3, the strut 20 is not secured at its ends to the supporting plates 16 and 17 but is instead slightly spaced from such plates so that substantially no resistance is offered to the turning movement of the strut 20 other than the resiliency of the rubber or other elastomer of which the body of the mount is molded.

For certain types of work and for the purpose of securing particular effects, it may be desirable to, in certain instances, secure, as by welding, the ends of the strut 20 to the plates 16 and 17 and such a structure is illustrated in Fig. 40 in which like parts are designated by like reference characters carrying the additional subscript $a$. In Fig. 40, the strut 40$a$ is welded at its edges 21$a$ and 22$a$ to the plates 16$a$ and 17$a$. When that expedient is employed, then the strut 20$a$ should be made of a sufficiently resilient material so that it will flex as the relatively movable parts such as the base 1$a$ and the pan 2$a$ are moved relatively to each other along a line which is substantially normal to the plane of the strut 20$a$, while at the same time the strut 20$a$ precludes substantially all relative movement between the base 1$a$ and the pan 2$a$ along lines parallel to the plane of the strut 20$a$.

The type of mount illustrated in Figs. 3 and 40 can be secured to the base and pan as for example by first welding as at 23 the plates 16 and 17 to reenforcing plates 16$b$ and 17$b$, the latter being in turn secured in any suitable way as by welding to the base 1$a$ and the pan 2$a$.

In the modification illustrated in Fig. 1, the base and pan of the conveyor are interconnected by means of a plurality of spaced individual couplers or connectors 11. Instead of using a plurality of such units, it is within the contemplation of this invention as most clearly illustrated in Fig. 2, to employ a mount which is a continuous rubber block 24 throughout the length of which there occur at spaced points struts 20$b$, the construction and function of which is the same as the strut 20 of the mount shown in Fig. 3. In the conveyor illustrated in Fig. 2, all of the other like parts will be given the same reference characters as the corresponding parts of Fig. 1.

In Fig. 4 there is illustrated one manner in which a mount such as that illustrated in Fig. 3 may be secured to the relatively movable parts of a machine such as the base 1 and the pan 2 of a vibratory conveyor such as that illustrated in Fig. 1. In this form of construction, a primary clamp member 25 is secured as by welding at 26 and 27 to the base and pan members. At one end the primary clamp member has an up-turned end 28 adapted to embrace the rebent ends 18 and 19 of the plates 16 and 17. The other end of the primary clamp members 25 is up-turned as at 29 and provided with a threaded opening in which is received an adjusting nut 30. The left-hand end of the adjusting bolts 30 position clamp members 31 in tightly embracing engagement with the rebent ends 18 and 19 of the mount 11.

The clamp members 31 after being thus forced into engagement with the mount are securely locked in position by means of bolts 32 which pass through elongated openings in the clamp members 31 and are threaded in the primary clamp members 25.

Fig. 5 illustrates a modified form of mount in which the rubber or other elastomeric material generally indicated at 33 is provided with a series of dovetail-like projections 34, 35 and 36 on one face and another series of somewhat similar projections 37, 38 and 39 on the other face. The dovetail-like projections of the rubber block are embraced in complementary grooves in end plates 40 and 41.

By an arrangement such as illustrated in Fig. 5, it is possible to extend the struts 42 into the dovetailed recesses in the spacing or supporting plates, at the opposite sides of the rubber blocks so that where the struts pivot at their ends, such action occurs in a confined area of the rubber so that wear and breakdown of the rubber in these points of flexure is reduced to a minimum.

Illustrated in Fig. 5 is the provision also of fabric inserts 43 in the rubber in the areas adjacent where it is dovetailed and keyed into the supporting plates 41 and 40, to strengthen the rubber against cracking in the areas of greatest flexure.

In Fig. 6 there is still another modified construction in which the same dovetailed principle is employed for securing the body of rubber 44 in and between the opposite securing and supporting plates 45 and 46. The primary difference between the structures illustrated in Fig. 5 and Fig. 6 is that the rubber block 44 is so shaped that the strut 47 lies substantially parallel to the face 48 on one side of the rubber block. If we assume that the plate 45 is secured to the base of a machine and the plate 46 is secured to the movable part such as the pan on a conveyor, then longitudinal reciprocation from right to left of the plate 46 as viewed in Fig. 6 will result in such plate moving in a general direction as indicated by the arrow 49. It will thus be seen that by the expedient illustrated in Fig. 6 the large area of rubber in the portion 50 of the rubber block 44 takes the load under compression and tension and the guiding movement is imparted by means of the strut 47 at right angles to the direction of relative movement between the plates 45 and 46. Similar loading of the block occurs in the form illustrated in Fig. 5 excepting that in Fig. 5 the larger amount of rubber in the upper right-hand corner of the figure will modify somewhat the performance characteristics of that form as compared with the arrangement illustrated in Fig. 6.

In Figs. 7 to 11 inclusive, I have shown the application of mounts or connectors formed in accordance with my invention for slightly different types of equipment, such as for instance motor mounts. In Fig. 7 the motor is secured to the threaded shaft 51 whereas the ring or confining shell surrounding the rubber block 52 is illustrated at 53 and may be either circular, rectangular or any desired configuration. In the modification illustrated in Fig. 7, the strut here generally indicated at 54 extends substantially radially of the axis of the shaft 51. The form of the radial strut generally indicated at 54 in Fig. 7 may be any of the forms such as illustrated in Figs. 8, 10 and 11. It will be noted that if the strut 54 were an uninterrupted flat annulus, it would interfere not only with the relative movement between the shaft 51 and the ring 53 in a direction at right angles to the axis of the shaft 51, but would also very materially restrict the relative displacement of the shaft 51 axially with respect to the ring 53. Because in order for the strut 54 to pivot and act as a lever and thus function in the manner of the strut 20 in Fig. 1, the inner periphery of the annulus would need to be so distorted that the annulus would take on a coniform shape. For this to occur, the annulus would need to be made of such thin section as not to provide very much resistance to relative displacement of the shaft 51 and the ring 53 in a direction normal to the axis of the shaft 51. A true lever action can be secured, however, by making the strut 54 in any of the forms illustrated in Figs. 8, 10 and 11. In said figures, Fig. 8 shows the strut divided into four plate-like sections 54, 55, 56 and 57. In this illustrated embodiment, the center shaft or pin on which the motor, for example, is movably supported is illustrated at 58 and is shown to be of rectangular cross-section and consequently the encompassing member 59 within which the rubber body 60 is molded is shown also as being rectangular in form.

When the parts are thus rectangles, then the components into which the strut is divided may also conveniently be rectangles as illustrated. Now when the central member 58 moves vertically, that is axially, with respect to the confining member 59, the plate-like sections 54 to 57, inclusive, of the strut can flex and act as true direction-imparting steps in the manner in which the element 20 of Fig. 1 accomplishes this same result.

When the central member carrying the load is a cylinder or round as illustrated at 60 in Fig. 10 and when the shell confining the rubber 61 is also cylindrical as at 62 in Fig. 10, then the segments into which the strut 54 is sub-divided, instead of being rectangular plates as illustrated in Fig. 8, now may be pie-shaped segments 63 which, because of their independent relationship in the body of molded rubber, may flex and pivot as does the strut 20 shown in Fig. 1.

As shown in Fig. 9, the central member of shaft 60 may be provided with a dovetailed annular recess on its periphery in the vicinity of the strut segment 63. By providing a dovetailed recess 64 in the shaft or rod 60, the same advantages accrue in this form of mount or connection as accrue from the use of correspondingly shaped dovetails in the modified forms of construction illustrated in Figs. 5 and 6 and as explained above.

In the structure illustrated in Fig. 11, the rubber block 65 is substantially cylindrical and is laterally confined in an annulus 66 to the ends of which are threadably secured end plates 67 and 68. The rubber block 65 is centrally provided with a molded-in metallic bushing 69 having flanges 70 and 71 on its opposite ends. The bushing 69 may receive a stud or other bolt or shaft 72 to which will be secured the machine part which is to be resiliently supported.

Molded in the rubber block 65 is a metallic annulus 73, the cross-sectional configuration of which is substantially an S-shaped curve as shown in cross-section in Fig. 11. The member 73 will preferably be provided with perforations throughout its extent so as to insure that it will, when molded in the rubber block, maintain its proper position throughout the life of the unit.

The configuration of the annulus 73 is such that it can function as a strut similar to the strut 20 of Fig. 1 or Fig. 3. By reason of the fact that flexure of the S-shaped cross-sectional form of the annulus 73 permits flexure under relatively light loads while at the same time resisting radial displacement under the influence of loads applied to the annulus 66 and/or the pin 72. Stated in another way, the annulus 73 by means of its flexure permits the bushing 69 to move relatively to the annulus 66 under resilient opposition which is due substantially entirely to the resiliency of the rubber from which the block 65 is formed. However, the annulus 73 is so positioned that relative radial movement between the annulus 66 and the bushing 69 is substantially precluded.

In Fig. 12, there is illustrated still a further modification of my connector or support. In this case the rubber block 74 is capped at its ends by means of rectangular U-shaped elements 75 and 76 held in position by means of bolts 77 and 78 respectively which not only pass through the U-shaped plates and the rubber block 74, but also through perforations in the ends of the strut 79. The cross-sectional configuration of the rubber block 74 is preferably rectangular, although other shapes may be used.

The strut 79 in this particular construction extends parallel to the opposite sides or faces of the rubber block 74 and at right angles to the end plates 75 and 76 and thus for proper functioning in the preferred manner, a connector of this type is preferably mounted in angularly spaced relation to the base 80 and the vibratory member 81 by means of gusset plates 82 and 83 which are triangular in shape and are welded or otherwise secured to the base 80, pan 87 and the end plates 75 and 76 of the connector.

In Figs. 13 to 16, inclusive, are illustrated modifications of the cross-sectional form of the rubber or other elastomer body adapted particularly for use in environments wherein a base 84 carrying the connector or support provides support for a vibrated element such as a conveyor pan 85.

Since the conveyor pan in order to support and move material therealong will be vibrated so that it has a substantial horizontal and vertical component, the latter being insured and controlled by the angular relation of the struts 86, 87, 88 and 89 and the former, i. e. the substantial horizontal component resiliently opposed by means of an annularly related leg 90, 91, 92 or 93. In the modifications illustrated in Figs. 13 to 16 inclusive, the rubber blocks which constitute an element of the connector are secured to the underside of the pan as by vulcanization and may be similarly secured to the base in the same manner or, as indicated in Fig. 13, auxiliary plates 94 and 95 may be utilized to embrace the opposite sides of the rubber blocks and additionally secure the rubber blocks to the base and pan. A similar arrangement is employed in Fig. 15 where similar auxiliary plates 96 and 97 are shown.

The modification illustrated in Fig. 17 is generally similar to the form illustrated in Figs. 3 to 6, inclusive, in that the rubber block 98 is secured by means of dovetailed connections with the plates 99 and 100 with the strut 101 extending into the dovetailed portions of the rubber block. Fig. 18 shows in perspective the strut 101 and here is illustrated the manner in which such strut may be perforated for the purpose of providing a better interlock between the strut and rubber as the strut is molded in the rubber during fabrication of the block.

At this point it should be noted that throughout this entire description the reference is made to various strut variously arranged, all such struts may be provided with perforations similarly to the manner in which strut 101 is shown perforated in Fig. 18. When the connector and support of this invention is used in environments like that illustrated in Fig. 1, it is necessary that the rubber block of the unit be secured to the two relatively movable members such as the pan and base so that it will function under both compression and tension. It is for this reason that expedients such as those illustrated in Figs. 4, 5, 6 become necessary so that the rubber block of the connector is firmly secured to the two relatively movable members so that the connector will oppose movement tending to separate the members as well as movement tending to move the members closer together. It is possible, however, to utilize the connector of the present invention under such environments that it will need to absorb only compressive stresses. One such arrangement is shown in Fig. 19 wherein extending between the base 102 and movable or vibrated pan 103 is a rubber block 104 containing a strut 105. Brackets 106 carried by the base cooperate with brackets 107 carried by the pan to provide an overlapping relationship in which may be mounted a rubber or other elastomeric body 108.

The parts in Fig. 19 will be assembled in such condition that the rubber blocks 108 are placed under compression and the rubber block 104 accordingly preloaded to an extent such that the blocks 108 will preclude all normally applied loads from separating the base 102 and the pan 103 to an extent more than the amount of pre-load on the block 104 so that the latter is never under tension, but always acts under compression.

A somewhat similar arrangement is illustrated in Fig. 20 wherein there is provided between the base 1 and the pan 2 a mount similar to that illustrated in Fig. 4. Associated with such mount is a second connector generally indicated at 109 which consists of a rubber block 110 having a strut 111 molded therein with such rubber block mounted between opposed brackets 112 and 113 respectively carried by the base 1 and the pan 2. The arrangement illustrated in Fig. 20 provides for one of the connectors to carry all forces tending to move the base and pan toward each other whereas the other connector carries all forces tending to move the base and pan apart. Whereas the construction illustrated in Fig. 19 will have the proper vertical and horizontal components imparted to the movement of the pan 103 under the influence of the strut 105, nevertheless the structure illustrated in Fig. 20 provides the same control but with the guiding forces distributed to units, that is between two struts 20 and 111 so that the construction illustrated in Fig. 20 has the directional forces more uniformly distributed than in the structure illustrated in Fig. 19.

In Fig. 21 is shown still a further arrangement whereby the base 114 and the pan 115 each carry angle brackets 116 and 117 respectively with rubber blocks 118 and 119 disposed therebetween with struts 120 and 121 so arranged that the forces tending to move the base and pan toward each other are carried and controlled by the lower unit 118 whereas the forces tending to move the base and pan apart are carried by the upper unit 119 with each of these units controlling the direction of relative movement because of the presence therein of the struts 120 and 121. In an arrangement such as shown in Fig. 21, of course, the parts will be assembled with the two rubber blocks 118 and 119 under sufficient pre-load so that at no time is either of them required to operate under tension.

In Figs. 22 and 23 there is illustrated still another modification by which the mount or connector may be so preloaded that it need never operate under tension, but will always operate under compression. In that modification, the base 122 and the pan 123 have a rubber block 124 with its angularly related strut 125 disposed therebetween and connecting the base and pan is a turnbuckle link 126 pivotally carried by pins 127 and 128 on the base and pan respectively. With the link 126 parallel to and in the immediate vicinity of the strut 125, the turnbuckle link may be so adjusted that the rubber block is always under compression and need never act in tension so that only superficial connection between the connector or support and the base 122 and the pan 123 will be required.

In Figs. 24 and 25 there is illustrated yet another way in which the connectors or support of the present invention may be utilized in pairs so that one will oppose forces in one direction and the other will oppose forces in the opposite direction so that under all circumstances each operates only under conditions of compression and never under conditions of tension. In that modification the pan 129 is provided with spaced brackets 130. Mounted above each of these brackets is a connector 131 and mounted below each of these brackets on the base 132 are a second pair of connectors or supports 133. Plates 134 positioned on top of the mounts 131 are drawn toward the base 132 thereby placing both mounts 131 and 133 under compression so that the mount 131 will oppose all forces tending to separate the base and pan whereas the mount 133 will oppose all forces tending to move the base and pan toward each other.

In Figs. 26, 27 and 28 there is illustrated a type of vibratory conveyor mechanism with which the mount or support of the present invention will be found to have particular utility. As most clearly illustrated in Fig. 26, and Fig. 28, the conveyor here illustrated is made up of a plurality of longitudinally extending pan sections 136, 137 and 138, with the central section 137 provided along its margin with rebent flanges 139 which are shown in enlarged section in Fig. 29 as overlying flanges 140 which extend upwardly along the inner margins of the lateral sections 136 and 138. Interposed in the space between the rebent flange 139 and the marginal flanges 140 is a soft rubber insert 141 which is sufficiently flexible to permit relative movement between the pan sections while at the same time sealing the area between the flanges 139 and 140 so as to prevent the egress of material through this area.

Each of the pan sections 136, 137 and 138 is provided with a plurality of longitudinally spaced mounting or connector units 142, 143 and 144 respectively. These preferably being arranged longitudinally of the conveyor in the manner illustrated in Fig. 1 or Fig. 2. Extending from the ends of each of the pan sections 136, 137 and 138 are brackets 145, 146 and 147 respectively in which there are bearings supporting a drive shaft 148 which is terminally provided with a pulley 149 by which it may be driven through a belt 150 from a motor 151. The shaft 148 at each of the points of bearing where it is encompassed by the projections 145, 146 and 147 is provided with eccentrics so that as the shaft 148 rotates the pan sections have a horizontal movement imparted thereto which, under the influence of the connectors or supports, is converted into both vertical and horizontal components. The eccentrics are preferably so arranged that those actuating the end sections 136 and 138 are in-phase, whereas the eccentric actuating the central section of the pan 137 is 180° out of phase. As the shaft 148 is rotated the pan sections are vibrated in such a manner that the loads on the center section 137 balance out the loads on the side sections 136 and 138.

When the material to be conveyed either in containers or in loose form is placed on a composite trough like that illustrated in Figs. 26 and 28, it, under the influence of the vibrations imparted to the sections of the conveyor trough, will be caused to progress longitudinally of the conveyor in the same manner as though the three sections of the conveyor were unitary.

In Figs. 30, 31 and 32 there is illustrated a somewhat similar form of conveyor in this case, however, the longitudinally extending trough which is vibrated is made up of only two sections 152 and 153. The section 153 is provided with a rebent flange along its inner edge which flange 154 is generally similar to the rebent flange 139 illustrated in Figs. 28 and 29 and the inner edge of the trough section 152 is provided with an upstanding flange 155 which is generally similar to the upstanding flange 140 in Figs. 28 and 29. Similarly as illustrated in Fig. 29, the space between the flanges 154 and 155 may be filled with a soft rubber gasket whereby egress of material in the conveyor pan is prevented in the area of overlap between the two pan sections. Instead of having the flange 154 extend upwardly as illustrated in Fig. 32, such flange may extend downwardly as flange 156 in Fig. 48 and when this is done, then the flange 155 will be likewise turned down as shown at 157 in Fig. 48 and the space then between such flanges filled with a soft rubber gasket 158 by which the material is prevented from leaking out of the pan in this area.

The conveyor pan section 152 has a bearing block 159 secured to one end thereof and pan section 153 has a similar bearing block 160 secured to its adjacent end and in these two bearing blocks, there is journalled a shaft 161 which is driven through the medium of a belt 162 from a motor 163.

The shaft 161 in the areas of the bearing blocks 159 and 160 is provided with eccentrics which are 180° out of phase so that as the shaft 161 is rotated the trough sections 152 and 153 will be reciprocated, i. e. vibrated in synchronism but at 180° out of phase so that the loads from these two sections are balanced out.

The pan sections 152 and 153 are supported on the base 164 through the medium of supports or connectors formed in accordance with this invention and respectively indicated at 165 and 166. The supports or connectors 165 and 16 may be any of the forms illustrated in the previous figures, as for example, the form illustrated in Fig. 3 or the particular one illustrated in Fig. 31 being for example generally similar to that illustrated in Fig. 6.

When the vibrated pan of a conveyor is unitary as the pan 167 of the feeder or conveyor illustrated in cross-section in Fig. 33, then the connector or mount of the present invention generally indicated at 168 in Fig. 33 may extend throughout the entire width of the pan 167 and in this way support such pan on the base 169.

Alternatively, the mounts or supports instead of extending entirely across the conveyor, as shown in Fig. 33, may occur as separate units 170 and 171 on opposite sides of the base 172. When the mounts or supports are thus spaced, then it is possible, especially when head room within which the conveyor is mounted is at a premium, to depress the central portion 173 of the pan 174.

The mount or connection which forms the subject matter of this invention is useful also in spiral vertical conveyors of the type generally illustrated in Figs. 35 and 36 wherein a central tube 175 is supported on a base 176 and has a helically arranged conveying flight 177 secured to its periphery. The central tube 175 is supported on a central shaft 178 which is preferably guided at its upper end in a bearing 179 and at its lower end 180 is supported in and vertically reciprocated by mechanism indicated generally at 181, but which is not described at this point because it forms no part of the present invention. Helical conveyors of this type are known in the art so that it is not necessary to more particularly describe the detailed construction thereof. Suffice it to indicate that the base 176 which is to be vibrated is resiliently supported on the platform 182 by means of a plurality of circumferentially spaced connector or supporting units 183, the form and construction of which is generally similar to any of those illustrated in the previous figures, such as for example in Fig. 3. For best results, however, it is to be noted that a construction such as is illustrated in Fig. 7 will preferably be employed in a spiral conveyor of the type illustrated in Fig. 35. With the bottom plate 184 of the mount or support secured to the platform 182 by means of a gusset plate 185 and the top plate 186, similarly supported on the base 176 by means of a gusset plate 187 so that the plane of the strut 188 which is relied upon to impart the desired direction to the movement given to the movable part of the conveyor inclined at an angle to the plane of the base 176, it is evident that as the spiral conveyor reciprocates in a generally spiral path the mount carrying the same will be subjected to a slight twisting action. In order to improve the performance of the mount under such circumstances, I prefer to use the type of construction illustrated in Fig. 37 wherein the rubber portion of the mount 189 which is held between the end plates 184 and 186 is provided with a strut which instead of being in the form of a plate as in the previous figures, is now made up of a plurality of spaced parallel rods generally indicated at 190, all of which lie in the same plane. When construction such as illustrated in Fig. 37 is used, then the top and bottom plates 184 and 186 may twist relatively to each other and the rods 190 will permit the rubber to conform to such twist, while at the same time, however, resisting deflection in the plane in which the rods are located so that they permit free movement in the spiral path while resisting deformation in directions at right angles thereto.

Instead of forming the mount or connector for the spiral conveyor from a plurality of single units spaced about the center as illustrated in Fig. 36, it is within the contemplation of this invention to form the mount in the shape of an annulus as illustrated in Fig. 38 wherein the rubber is molded as a complete annulus 191 with rods 192 imbedded therein in groups similarly to the manner in which the rods 190 are arranged in the structure illustrated in Fig. 37.

In connection with the utilization of the improved mount or connector with a spiral conveyor, it will be observed that the movable portion of such conveyor instead of being driven at the bottom as illustrated in Fig. 35, it is entirely feasible to drive the movable part of the conveyor from the upper end of the movable part.

For use with certain types of relatively movable parts the modified form of support or connector illustrated in Fig. 39 may be used. The structure illustrated in that figure comprises end plates 193 and 194 which are connected by means of gusset plates 195 and 196 respectively to a base 197 and a movable part 198. Molded or otherwise secured as by bolts 199 and 200 in the end plates 193 and 194 are rubber elements 201 and 202 which have molded therein a strut 203, such that the rubber elements 201 and 202 may be separate as illustrated in Fig. 39 or continuous by the inclusion of a rubber face on the opposite sides of the strut 203. The construction illustrated in Fig. 39 is useful in certain environments and especially where the parts are not subjected to high unit loading. In the structure of Fig. 39, the adherents between the rubber and the strut stiffens the latter agains flexure due to applied loads along its longitudinal axis. However, the flexure of the rubber resiliently opposes relative movement between the movable parts 197 and 198 along the plane of the strut 203. Inasmuch as the strut 203 does not have a direct inflexible connection with any of the other metallic parts of the assembly, it will serve in the capacity of a guide for the relative movement between the parts 197 and 198 in somewhat the same manner as the strut 20 similarly provides a guiding action in the structure illustrated in Fig. 3.

In Figs. 41 and 42 there is illustrated a form of double-deck vibratory conveyor which is admirably suited to utilize the connector or support of the present invention. As most clearly illustrated in the cross-sectional view in Fig. 42 the two separate conveyors are constructed substantially like the single conveyor illustrated in Fig. 34 so that like reference characters will be employed to designate like parts.

As most clearly illustrated in Fig. 41, the upper conveyor A is connected by a pitman arm 204 to an eccentric mounted on the shaft 205 and the lower conveyor B is connected by means of a pitman arm 206 to another eccentric on the shaft 205 which is 180° out of phase with the eccentric to which the pitman arm 204 is connected. When then the shaft 205 is driven by means of the belt 207 from the motor 208 the top and bottom conveyors A and B will be 180° out of phase so that the load on the shaft 205 is balanced.

As previously explained, when only a single connector or mount is utilized between two relatively movable members, means must be provided to insure that the rubber portion of the mount will be effective in tension as well as in compression and thus there is presented the problem of providing adequate adherence between the rubber and the end plates on the mount by which the latter is connected to the relatively movable members. One solution to this problem is illustrated in the modification illustrated in Figs. 43 and 44 wherein the U-shaped end plates 209 has a series of parallel tubes 210 secured thereto by means of studs or bolts 211 prior to the end plates and their thus assembled tubes being molded into the rubber blocks 212. By this arrangement, there is provided not only a large surface area to which the rubber may be secured by adhesion, i. e. vulcanization, but also in the area where such connection is made there is the possibility of efficient radiation of any generated heat by virtue of air circulation through the tubes 210.

When the arrangement illustrated in Fig. 43, then one or more struts 213 will be molded in the rubber block 212 in the manner previously explained in connection with the description of the previous modification.

Illustrated in Figs. 45 and 46 is still another modified form of mount characterized particularly by a novel method of insuring that the mount may operate effectively under tension as well as compression. In the modification illustrated in Figs. 45 and 46, there are molded into the rubber blocks a plurality of perforated bars 214. In this form of construction the rubber block is vulcanized with the perforated bars 214 therein and the perforated strut 215 arranged therein as illustrated. After this assembly is formed, then it may be clamped between plates 216 and 217 by means of removable clamp bars 218 held in assembled relation as illustrated by bolts 219. When the entire assembly is thus prepared, then the rubber block 220 has such great adherence to the bars 214 by adhesion and by virtue of the openings in such bars, that amount will be effective to resist separation when forces occur which tend to separate the movable parts connected by the mount.

Illustrated in Fig. 47 is a sectional pan vibrator generally similar to the construction illustrated in Fig. 26 in that it is made up of three longitudinal pan sections 221, 222 and 223. Each of these sections is supported by a series of independent mounts or connectors 224 carried by the base 225. The longitudinal margins of the pan sections 221, 222 and 223 are bent downwardly and bear on longitudinal rectangular strips or rubber or like elastic material 226 supported on flanges 227 carried by the base 225. The three sections of the trough of the pan shown in Fig. 47 will preferably be energized or vibrated similarly to the way the three sections of the conveyor illustrated in Fig. 26 are energized.

The material from which the body of the mounts or connectors of this invention may be made may be any suitable elastomer such as natural or synthetic rubber. Inasmuch as units of this kind are used many times in environments where there are present materials which would tend to deteriorate natural rubber, I prefer to form the body of synthetic rubber such as neoprene, butyl, or GR–S and I have found that an elastomer substantially like that used for the formation of the tread portions of automobile tires is admirably suited for use. That material is well suited for use because its character is such as to be capable of successfully withstanding repeated deformation without deterioration while at the same time possessing the desired degree of elasticity.

The mounts or connectors of the present invention are suited particularly for use in environments where the relative movement between the two machine parts such as the base and pan of a vibrated conveyor or feeder operate at relatively high frequency and low amplitude. For example, in a conveyor as illustrated in Fig. 1 with the individual rubber mounts having a cross-section of 2 inches by 2 inches and a height of 3 inches and having molded therein a strut formed of 12-gauge steel sheet and the trough vibrated by a pitman arm acting in a substantially horizontal direction at a frequency of 1500 and an amplitude of ⅛″, the pan was capable of conveying either solid, bulk or packaged materials at a lineal speed of more than 80 feet per second.

Whereas a metallic spring, when used to support a relatively movable member such as the pan of a vibratory conveyor or feeder, has a definite natural frequency, thus making it possible to considerably conserve energy by operating the equipment at the natural frequency of the spring, this is not true of elastomeric materials such as rubber and the like since they do not exhibit the same sharp peak of natural frequency which characterizes metallic springs. In order to give to the mounts or connectors of the present invention a more pronounced natural frequency, there may be included therein as illustrated in Fig. 49, a spring 230 which in this illustrated embodiment of the invention is shown incorporated in a mount or connector whose configuration is generally similar to that shown in previous Fig. 13 wherein the elastomeric body consists of one portion 231 in which the strut 232 is molded and a second leg 233 which, as previously explained, is designed primarily to take the forces tending to cause relative movement between the base 234 and the movable member or pan 235.

By having the springs 230 bear against the strut 232 at one end and against the metal backing plate 236 at the other end, the resiliency of the mount along the axis of the spring may be made to approach that of the natural frequency of the spring included in the mount.

It is also contemplated that instead of using the spring 230 in a construction like that illustrated in Fig. 49 similar spring means may be used in any of the other forms of connectors or mounts illustrated in the other figures.

When utilizing a mount of any of the forms illustrated herein, it is also within the contemplation of this invention to provide, as illustrated in Fig. 49, a closed recess or chamber 237 therein which is sealed to the atmosphere with the exception of an air connection thereto provided as by means of the nipple 238 through which air or other fluid, even liquids under pressure, may be introduced into the cavity 237 for the purpose of controlling the deflection of the mount or connector under load and to vary its response to different loadings.

Fig. 50 has been included to show the manner in which the connector or mount, when constructed in accordance with the form illustrated in Fig. 3, changes shape or is deflected under load as for example when it is used to support a vibratory conveyor as illustrated in Fig. 1. Under environments such as in Fig. 1, the base plate 239 will, of course, always remain stationary since it is secured to the base of the machine. The top plate 240, being connected to the bottom of the conveyor pan, will always be maintained parallel to the base 239 but its movement will be on an arc 241, the center of which is the fulcrum or lower end of the strut 242. In Fig. 50, the full line illustration is that of the connector under substantially no load whereas the other two illustrated positions are those which, for example, might be occupied by the upper plate at the extremes of movement of the conveyor.

Fig. 51 has been included in order to illustrate graphically the manner in which the mount or connector bears in resiliency along various planes. For example, when a load is applied to the connector along plane A—A, which coincides with the strut, there is practically no deformation of the mount, whereas when a load is applied along the plane D—D or parallel thereto, the resiliency of the mount will be at its maximum. When, therefore, a load is applied to the mount along or parallel to any of the axes of B—B or C—C, the resiliency of the mount will be at a value below the resiliency of the mount along the plane D—D but, of course, greater than along the plane A—A.

In view of the fact that the vertical and horizontal components of movement of the movable elements in the machine connected by the mounts of the present invention will vary in accordance with the angular relation between the strut 243 and the direction along which the movable element is caused to move, it becomes desirable under many conditions of use as for example in conveyors or even greater in feeders and especially also in spiral conveyors to be able to change the angular relation between the strut and the direction of movement of the movable element. This can be accomplished very readily when utilizing a connector or mount made in accordance with the present invention to have the opposite ends thereof secured to connector segments 244 and 245 which are provided with dovetail projections engaged by complementary, equally-spaced dovetail projections in the movable element or pan 246 and the base 247. Position of the mount, that is, its angular relation to the pan or base when once selected, can then be secured by a set-screw such as 248 threaded in an opening in the pan or base and engaging on one or both of the segments 244 and 245.

In connection with Fig. 52, it should be noted that when the dovetail projections on the opposite ends of the mounts are equally spaced, it is possible to axially disengage the parts and then re-engage them in a different angular relation so as to bring the strut 243 into proper angular relation to the direction of movement of the movable part so that for a given increment of displacement of the pan, for example as would occur when connected with an eccentric drive as illustrated in Fig. 1, i. e., with a constant displacement due to such eccentric, the amount of such displacement can be converted into different quantities of vertical and horizontal movement. This selection is particularly desirable on feeders and spiral conveyors where the amount of load is of greater significance as to the operation of the device and is the case in horizontal conveyor such as those illustrated in Fig. 1.

As previously indicated, the changing of the angle of inclination of the strut in the mount or connector is not particularly critical or necessary in conveyors such as illustrated in Fig. 1. Actually, it has been found that in equipment of that kind, best results are secured if the strut is inclined at an angle of 60° to the plane of the movable pan. It has been found also that for best results there is a certain relationship between the various dimensions of the rubber mount or connector and the stroke as well as the resiliency of the rubber.

As an illustration of proportions which have been found to give very good results, the rubber portion of the mount or connector is two inches in the direction of vibration, that is, two inches along which the material is to be conveyed. The other dimension of the cross-section of the rubber will depend on various factors as illustrated and described previously. For instance, the rubber may extend entirely across the conveyor pan or it may be divided into sections. The only critical limitation on the dimension of the cross-section of the rubber insofar as effective vibration is concerned is in the direction of movement of the material.

Likewise when using the mount or connector in a conveyor as illustrated in Fig. 1, the vertical distance through which the rubber extends may be 3 inches and when a rubber having a 40 durometer is used, it is possible to secure very efficient vibrations of ⅛ inch. The factors given above have been arrived at out of considerations of most efficient use of the equipment and longest life of the rubber mount. When, therefore, it is desired to secure a ¼ inch stroke, the 2-inch and 3-inch dimensions given above will be doubled and for other amplitudes, the 2-inch and 3-inch dimensions should be changed accordingly. The durometer or elasticity of the rubber is, of course, another factor which will enter into considerations of most efficient size. The values given above have been for a 40-durometer rubber and, of course, if a softer or harder rubber is used, compensations will be made for those variables.

The foregoing statements have been made without regard to frequency since it has been found that variations in frequency need not be taken into account in designing the most efficient and most economical size of rubber mount to be used. The foregoing statements are, of course, made in full recognition of the fact that certain rubbers may be so hard that vibration at high frequencies will lead to generation of excessive heat and there may be other factors, of course, which will have a bearing on the most efficient rubber to be used for a particular frequency.

The foregoing reference to different frequencies is not to be misunderstood as indicating that certain frequencies may not be particularly desirable. For instance, when utilizing the natural frequency of the rubber or the natural frequency of a modified mount as illustrated in Fig. 49, of course, the operation of the equipment will be at its most efficient level if it is operated in the natural frequency range.

Figure 2:
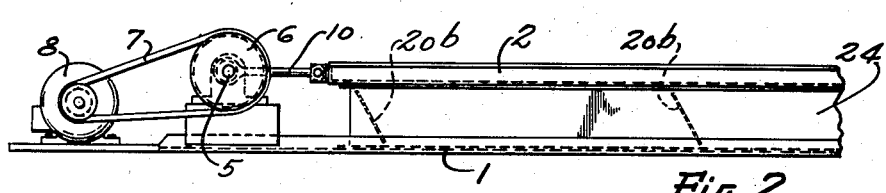
Fig. 2 is a side elevational view of a portion of another form of vibratory conveyor utilizing another form of connector made in accordance with this invention.

In the appended claims, the term "longitudinally of said body" is intended to denote the direction along which the elastomeric body is deflected as for example in Figs. 1 and 2 under the influence of the drive shown in such figures. Also, the term "the vertical axis of said elastomeric body" is intended to denote the axis extending through said body which is normal to the direction of the applied load as for example the vertical axis of the connectors shown in Figs. 1 and 2 extend at right angles to the base of the pan 2 and the vertical axis of the elastomeric body shown in Fig. 12 is the vertical line extending therethrough normal to the elements 80 and 89 and intersecting the strut 79.

The alternate form of construction illustrated in Fig. 12A is characterized particularly by having the metal end pieces of attachment plates 250 molded in the body of the rubber block 251 so as to be flush with the surface thereof. A further and principal characteristic of this form is that the strut 252 is terminally provided with knife edges 253 which fit into grooves 254 provided therefor in the end plates 250 so as to provide an actual metal-to-metal knife edge bearing between the strut and the end plates.

Other modes of applying the principle of the invention may be employed, change being made as regards the details described, provided the features stated in any of the following claims or the equivalent of such be employed.

I, therefore, particularly point out and distinctly claim as my invention:

1. A resilient connection device comprising an elastomeric body having metallic elements on opposite load-bearing faces, a strut embedded in said body and having at its opposite ends knife-edged bearing engagement with said metallic elements, said strut being so composed and arranged that said load-bearing faces in moving relatively to each other along a first line are opposed in such movement only by the elastomer of said body whereas relative movement between such faces along a second line is substantially prevented.

2. A resilient connection device as defined in claim 1 wherein said metallic elements are formed with grooves in which the respective ends of said strut are engaged.

3. A resilient connection device as defined in claim 1 wherein said metallic elements are in the form of metal plates constituting substantially the entire areas of said load-bearing faces of said body.

4. A resilient connection device as defined in claim 1 wherein said strut constitutes a guide for relative movement of said load-bearing faces along such first line.

5. A resilient connection device as defined in claim 1 wherein said body is generally rectangular to provide parallel load-bearing faces and wherein said strut extends diagonally between said faces.

6. A resilient connection device as defined in claim 1 wherein said strut is substantially a flat plate and said load-bearing faces are substantially parallel to each other.

References Cited in the file of this patent

UNITED STATES PATENTS

| | | |
|---|---|---|
| 1,720,545 | Dickey | July 9, 1929 |
| 1,735,899 | Henry | Nov. 19, 1929 |
| 1,783,394 | Stranahan | Dec. 2, 1930 |
| 1,787,539 | Leipert | Jan. 6, 1931 |
| 1,795,432 | Leipert | Mar. 10, 1931 |
| 2,552,667 | Dath | May 15, 1951 |
| 2,706,112 | Carrier | Apr. 12, 1955 |